(12) United States Patent
Fu et al.

(10) Patent No.: US 9,317,765 B2
(45) Date of Patent: Apr. 19, 2016

(54) HUMAN IMAGE TRACKING SYSTEM, AND HUMAN IMAGE DETECTION AND HUMAN IMAGE TRACKING METHODS THEREOF

(71) Applicant: NATIONAL TAIWAN UNIVERSITY, Taipei (TW)

(72) Inventors: Li-Chen Fu, Taipei (TW); Ting-En Tseng, Taipei (TW); An-Sheng Liu, Taipei (TW); Po-Hao Hsiao, Chiayi (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 260 days.

(21) Appl. No.: 14/146,432

(22) Filed: Jan. 2, 2014

(65) Prior Publication Data
US 2015/0049906 A1     Feb. 19, 2015

(30) Foreign Application Priority Data
Aug. 15, 2013 (TW) .............................. 102129366 A (51) Int. Cl.
*G06K 9/00* (2006.01)
*G06K 9/32* (2006.01)

(52) U.S. Cl.
CPC .......... *G06K 9/3241* (2013.01); *G06K 9/00362* (2013.01)

(58) Field of Classification Search
None
See application file for complete search history.

(56) References Cited

U.S. PATENT DOCUMENTS

| | | | | |
|---|---|---|---|---|
| 8,238,607 B2* | 8/2012 | Wang | ............... | G06K 9/00771 382/103 |
| 8,448,056 B2* | 5/2013 | Pulsipher | ........... | G06K 9/00369 348/169 |
| 8,879,787 B2* | 11/2014 | Ikenoue | ............... | G06F 3/012 382/103 |
| 2005/0031166 A1* | 2/2005 | Fujimura | ........... | G06K 9/00369 382/103 |
| 2013/0243240 A1* | 9/2013 | Marks | ............... | F24F 11/0034 382/103 |
| 2014/0307921 A1* | 10/2014 | Dhome | ............... | G06T 7/0046 382/103 |

* cited by examiner

*Primary Examiner* — Wesley Tucker
(74) *Attorney, Agent, or Firm* — Huffman Law Group, PC (57) ABSTRACT

A human image detection and tracking systems and methods are disclosed. A human image detection method comprises receiving a depth image data from a depth image sensor by an image processing unit, removing a background image of the depth image sensor and outputting a foreground image by the image processing unit, receiving the foreground image and operating a graph-based segment on the foreground image to obtain a plurality of graph blocks by a human image detection unit, determining whether a potential human region exists in the graph blocks, determining whether the potential human region is a potential human head region, determining whether the potential human head region is a real human head region, and regarding the position of the real human head region is the human image position by the human image detection unit if the potential human head region is the real human head region.

25 Claims, 6 Drawing Sheets

HUMAN IMAGE TRACKING SYSTEM, AND HUMAN IMAGE DETECTION AND HUMAN IMAGE TRACKING METHODS THEREOF

CROSS-REFERENCE TO RELATED APPLICATION(S)

This application claims priority to Taiwan Patent Application No. 102129366, filed on Aug. 15, 2013, the disclosure of which is hereby incorporated by reference in its entirety.

BACKGROUND

1. Field of the Disclosure

The present disclosure relates to a tracking system, and image detection and tracking methods thereof, and more particularly, to a human image tracking system, and human image detection and tracking methods thereof.

2. Description of the Related Art

A surveillance system may be used for various purposes such as recording videos in real time by its installation at an entrance of a factory building, a dormitory, a commercial building, or a community and so on. The surveillance system can deter robbers, criminals, petty thieves, and other unscrupulous elements. However, identifying or tracking suspicious people may be insufficient if the record is merely monitored by security. Hence, there is a need for a surveillance system that can detect and track a human image.

Generally, indoor surveillance systems that can detect and track human images are categorized into side view types and top view types. The side view type surveillance systems often encounter a problem caused by occlusion of tracked targets, which makes it difficult to identify the missing parts. Unfortunately, there is no convincing approach for eliminating the obstacle of server occlusion. Further, the side view type surveillance systems usually use color cameras, which do not operate well in dim environments. The top view type surveillance systems can distinguish human images by extracting depth data, and more particularly by seeking the local area with a maximum value of depth data, but they often tend to mistake a floor lamp as a person's head.

In sum, the challenges faced by surveillance systems remain in detection precision and instantaneity.

SUMMARY

The present disclosure describes a human image detection method for detecting a human image position in a detection area, a human image tracking method for tracking a human image in a detection area operated by a human image tracking unit, and a human image tracking system for detecting and tracking a human image position in a detection area. These methods and systems may be applied for monitoring a human image in indoor environments.

In an embodiment, the human image detection method for detecting a human image position in a detection area comprises receiving by an image processing unit a depth image data from a depth image sensor, removing by the image processing unit a background image of the depth image data for obtaining a foreground image, receiving by a human image detection unit the foreground image, which performs a graph-based segment process on the foreground image to obtain a plurality of graph blocks, determining by the human image detection unit whether a potential human region exists in the graph blocks according to an area size of each graph block, determining by the human image detection unit whether the potential human region is a potential human head region according to a similarity between the potential human region and a hemisphere model if the potential human region exists, determining by the human image detection unit whether the potential human head region is a real human head region according to an area size of a surrounding region adjacent to the potential human head region if the potential human region is the potential human head region, and determining by the human image detection unit the position of the real human head region as the human image position if the potential human head region is the real human head region.

In an embodiment, the human image tracking method for tracking a human image in a detection area operated by a human image tracking unit connected to an image processing unit and a human image detection unit comprises receiving a current human image position from the human image detection unit and a prior tracking position detected by the human image tracking unit, determining whether a distance between the current human image position and the prior tracking position is less than a sixth predetermined critical value, generating a plurality of supposed current human image positions adjacent to the prior tracking position if the distance is less than the sixth predetermined critical value, calculating a plurality of depth distribution similarities between the supposed current human image positions and the prior tracking position, calculating a plurality of accurate possibilities of the supposed current human image positions according to the plurality of depth distribution similarities, and selecting the supposed current human image position corresponding to a maximum accurate possibility as a current tracking position of the human image.

In an embodiment, the human image tracking system for detecting and tracking a human image position in a detection area comprises a depth image sensor and a human image tracker, in which the depth image sensor is configured to detect a depth image data in the detection area, and the human image tracker comprises an image processing unit, a human image detection unit, and a human image tracking unit. The human image detection unit is connected to the image processing unit and configured to receive the depth image data and remove a background image of the depth image data for obtaining a foreground image. The human image detection unit is connected to the image processing unit. The human image detection unit is configured to receive the foreground image, perform a graph-based segment process on the foreground image to obtain a plurality of graph blocks, determine whether a potential human region exists in the graph blocks according to an area size of each graph block, determine whether the potential human region is a potential human head region according to a similarity between the potential human region and a hemisphere model, determine whether the potential human head region is a real human head region according to an area size of a surrounding region adjacent to the potential human head region, and regard the position of the real human head region as the human image position if the potential human head region is the real human head region. The human image tracking unit is connected to the human image detection unit. the human image tracking unit is configured to receive a current human image position from the human image detection unit and a prior tracking position detected by the human image tracking unit, generate a plurality of supposed current human image positions adjacent to the prior tracking position according to a distance between the current human image position and the prior tracking position, calculate a plurality of depth distribution similarities between the supposed current human image positions and the prior tracking position, calculate a plurality of accurate possibilities of the supposed current human image positions according to the depth distribution similarities, and select the supposed current human image position corresponding to the maximum accurate possibility as a current tracking position of the human image.

Overall, the present disclosure describes methods and systems that improve processing speed of detecting human images by performing a graph-based segment process. In addition, the methods and systems take an area size of a surrounding region adjacent to a head region into consideration, which can increase detection precision. The human image tracking methods can be improved by supposing a next time tracking position.

The foregoing is a summary and shall not be construed to limit the scope of the claims. The operations and devices disclosed herein may be implemented in a number of ways, and such changes and modifications may be made without departing from this disclosure and its broader aspects. Other aspects, inventive features, and advantages, as defined solely by the claims, are described in the non-limiting detailed description set forth below.

BRIEF DESCRIPTION OF THE DRAWINGS

FIGS. 2B($a$)-2B($c$) depict depth image data of a human image detection method, in accordance with an example embodiment of the present disclosure.

FIGS. 4($a$1)-4($a$3) and 4($b$1)-4($b$3) depict depth distribution histograms of a human image tracking method, in accordance with an example embodiment of the present disclosure.

DETAILED DESCRIPTION OF EMBODIMENTS

For a more complete understanding of the present disclosure and its advantages, reference is now made to the following description taken in conjunction with the accompanying drawings, in which like reference numbers indicate like features. One of ordinary skill in the art will understand other varieties for implementing example embodiments, including those described herein. The drawings are not limited to specific scale and similar reference numbers are used for representing similar elements. As used in the disclosure and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
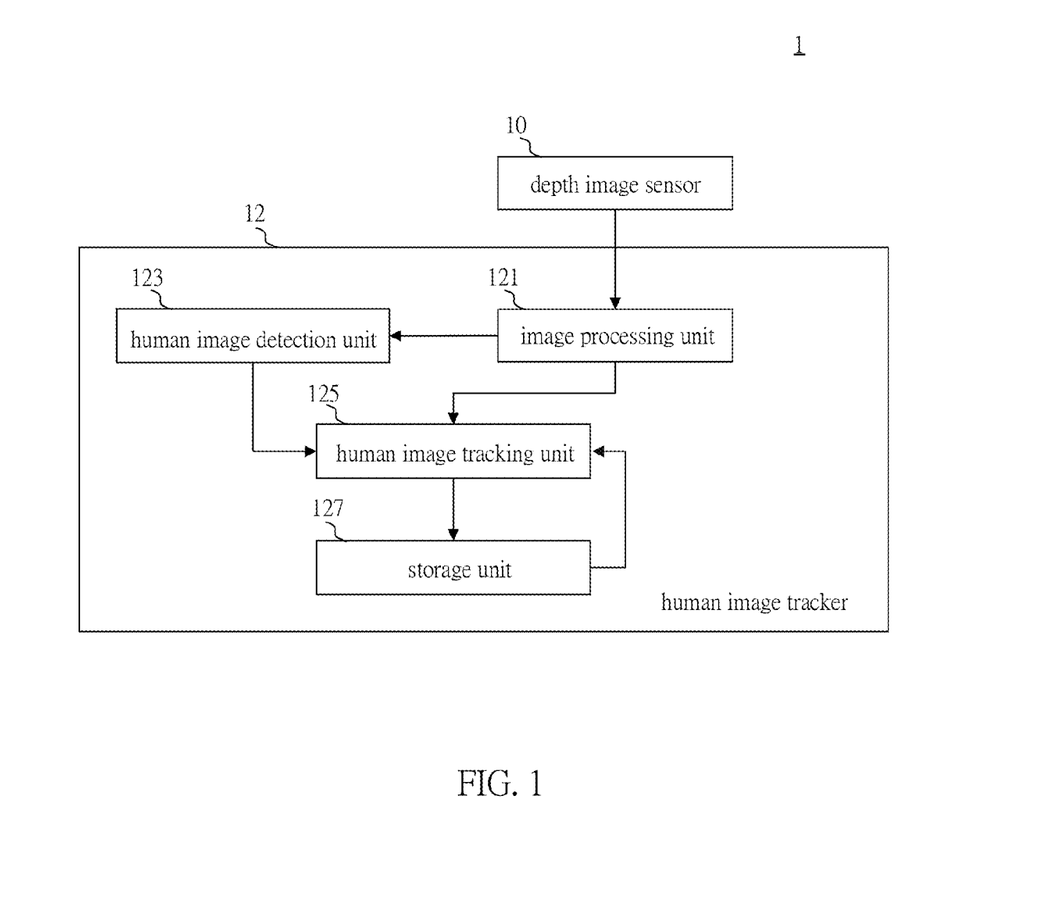
FIG. 1 depicts a block diagram illustrating a human image tracking system, in accordance with an example embodiment of the present disclosure.

FIG. 1 depicts a block diagram illustrating a human image tracking system, in accordance with an example embodiment of the present disclosure. The human image tracking system 1 comprises a depth image sensor 10 and a human image tracker 12, in which the depth image sensor 10 is connected to the human image tracker 12. In an embodiment, the depth image sensor 10 may comprise a distance sensor installed in top-view of a detection area for viewing an object in the detection area. A three dimensional depth image data (x,y,z) detected by the depth image sensor 10 includes a position of the object in the detection area and a distance z between the object and the depth image sensor 10.

The human image tracker 12 may comprise an image processing unit 121, a human image detection unit 123, a human image tracking unit 125, and a storage unit 127. The image processing unit 121 is connected to the depth image sensor 10, the human image detection unit 123, and the human image tracking unit 125. The human image detection unit 123 and the storage unit 127 are connected to the human image tracking unit 125.

Figure 2A:
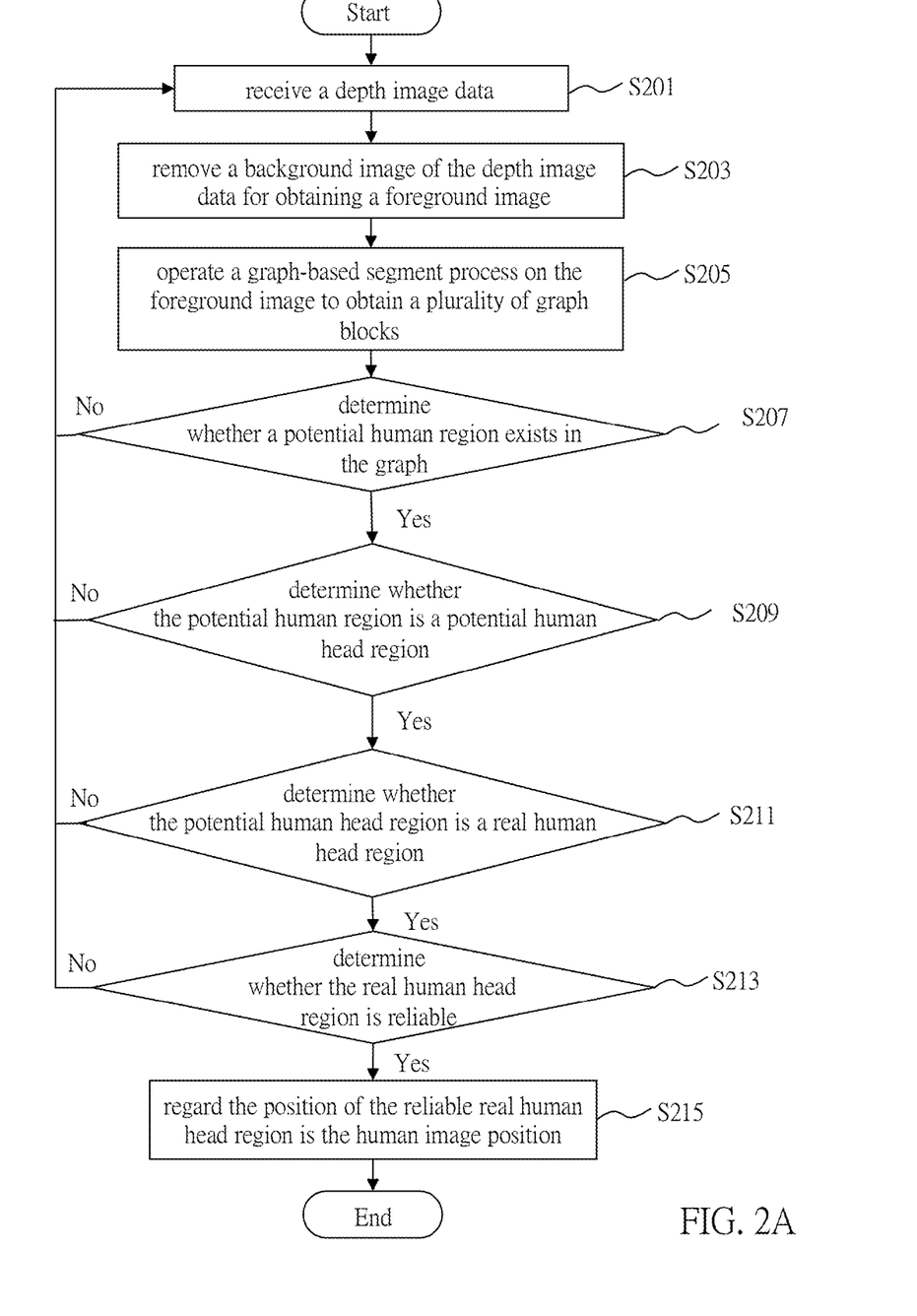
FIG. 2A depicts a flow chart of a human image detection method, in accordance with an example embodiment of the present disclosure.
Figure 2B:
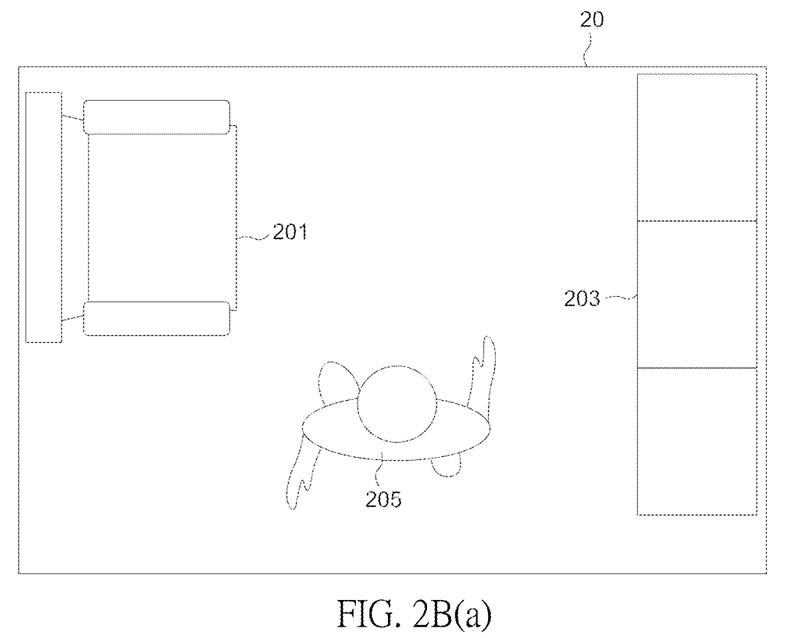

FIG. 2A depicts a flow chart of a human image detection method, in accordance with an example embodiment of the present disclosure. FIGS. 2B($a$)-2B($c$) depict depth image data of a human image detection method, in accordance with an example embodiment of the present disclosure. In an embodiment, the image processing unit 121 periodically receives a plurality of depth image data 20 from the depth image sensor 10 (S201). The image processing unit 121 removes a background image of the depth image data 20 in order to obtain a foreground image 21 by comparing a prior depth image data $(x_j,y_j,z_j)$ with a current depth image data $(x_i,y_i,z_i)$ (S203). For example, the image processing unit 121 regards the stationary objects 201, 203 as the background image, while regarding a moving object 205 and other unnecessary noise as the foreground image 21.

To remove the moving object that is probably not a human image or noise, the human image detection unit 123 receives the foreground image 21 and performs a graph-based segment process on the foreground image 21, thereby obtaining a plurality of graph blocks (S205). More specifically, the human image detection unit 123 calculates a plurality of depth differences between two adjacent pixels of all pixels of the depth image data. The human image detection unit 123 sorts out partial pixels having depth differences less than a first predetermined critical value from all the pixels and classifies the partial pixels as belonging to the same graph block. For example, the human image detection unit 123 calculates depth differences between two adjacent pixels of one subset image 211 of the foreground image 21, in which the depth difference between a pixel Pa and a pixel Pb is 3, and the depth difference between a pixel Pc and a pixel Pd is 2. If the first predetermined critical value is supposed to be 8, the human image detection unit 123 sorts out the pixels having depth differences less than 8 from the other pixels and connects the sorted out pixels to form an edge of the graph block. Accordingly, the pixels in the edge are classified as belonging to the same graph block. Generally, pixels in each part of the human image can be located in continuous regions, and depth differences of the pixels in the same part are quite small. On the other hand, the depth differences of the pixels in different parts of a human image are quite great. Therefore, the human image detection unit 123 can divide different parts of the human image according to a comparison of the depth differences of the pixels and the first predetermined critical value. The different parts of the human image may be a head 2051, shoulders 2053, and arms 2055 and 2057. Accordingly, the human image detection unit 123 can filter possible human body parts from the foreground image 21, and save the processing time of noise analysis.

Further, the human image detection unit 123 calculates an area size of each graph block. The human image detection unit 123 determines whether a potential human region exists in the graph blocks by comparing the area size of each graph block with a second predetermined critical value (S207). If a graph block's area size is greater than the second predetermined critical value, the human image detection unit 123 determines that the larger graph block is a potential human region. On the other hand, if area sizes of all the graph blocks are less than the second predetermined critical value, the human image detection unit 123 determines that there is no potential human region in the graph blocks, and the method returns to the step S201.

If a potential human region exists, the human image detection unit 123 determines whether the potential human region is a potential human head region according to a similarity between the potential human region and a hemisphere model (S209). More specifically, the human image detection unit 123 cites numerous coordinate parameters (a,b,c) of different hemisphere models with different sizes, and compares the coordinate parameters (a,b,c) with the three dimensional coordinates (x,y,z) to obtain the different $d_h$ as presented in equation (1) as follows:

$$d_h(x, y) = \left| \sqrt{\frac{x^2}{a^2} + \frac{y^2}{b^2} + \frac{z^2}{c^2}} - 1 \right| \quad (1)$$

In an embodiment, a smaller difference $d_h$ represents a higher similarity, and a larger difference $d_h$ represents a lower similarity. After obtaining the similarity, the human image detection unit 123 further determines whether the similarity is higher than a third predetermined critical value. If the similarity is higher than the third predetermined critical value, the human image detection unit 123 determines the potential human region may be a potential human head region and searches the coordinate parameter (a,b,c) of the hemisphere model that is most similar with the potential human image region, which is a coordinate parameter (a,b,c) satisfying equation (2) as follows:

$$\varepsilon = \underset{a,b,c}{\operatorname{argmin}}(d_h(x, y, z)) \quad (2)$$

On the other hand, if the similarity is lower than the third predetermined critical value, the human image detection unit 123 decides that there is no potential human region. The method then returns to the step S201.

The human image detection unit 123 regards a central position of the most similar hemisphere model as a central position of the potential human head region. To verify whether the potential human head region is a real human head region or a moving spherical object, the human image detection unit 123 further determines an area size of a surrounding region adjacent to the potential human head region (S211). More specifically, after the human image detection unit 123 regards the central position of the most similar hemisphere model from the step 209 as the central position of the potential human head region, the human image detection unit 123 calculates a plurality of depth differences between the potential human head region and the surrounding region adjacent to the potential human head region and adds the sum of the smaller depth differences in which each smaller depth difference is smaller than a fourth predetermined critical value. Accordingly, the human image detection unit 123 measures the area size of the surrounding region according to the sum of the smaller depth differences in order to determine whether the area size of the surrounding region is greater than a fifth predetermined critical value.

If the area size of the surrounding region is greater than the fifth predetermined critical value, the human image detection unit 123 determines that the potential human head region is the real human head region, and regards the central position of the real human head region as the human image position (S215). If the area size of the surrounding region is less than the fifth predetermined critical value, the human image detection unit 123 determines that the potential human head region is not the real human head region, and the method returns to the step S201.

Misinterpretation may occur because the human image detection unit 123 may not detect each image of all frames after receiving a foreground image. Thus, in an embodiment, in addition to the step S211, the human image detection unit 123 determines whether the real human head region is reliable (S213). More specifically, the human image detection unit 123 may count the number of times the real human head region in continuous different frames is detected. For example, if the number of times the real human head region is detected is greater than two in five continuous frames, the human image detection unit 123 determines that the real human head region is reliable. The number of times is not limited to the above-mention configuration. Accordingly, the detection results of the human image tracker 12 may be more reliable.

Figure 3:
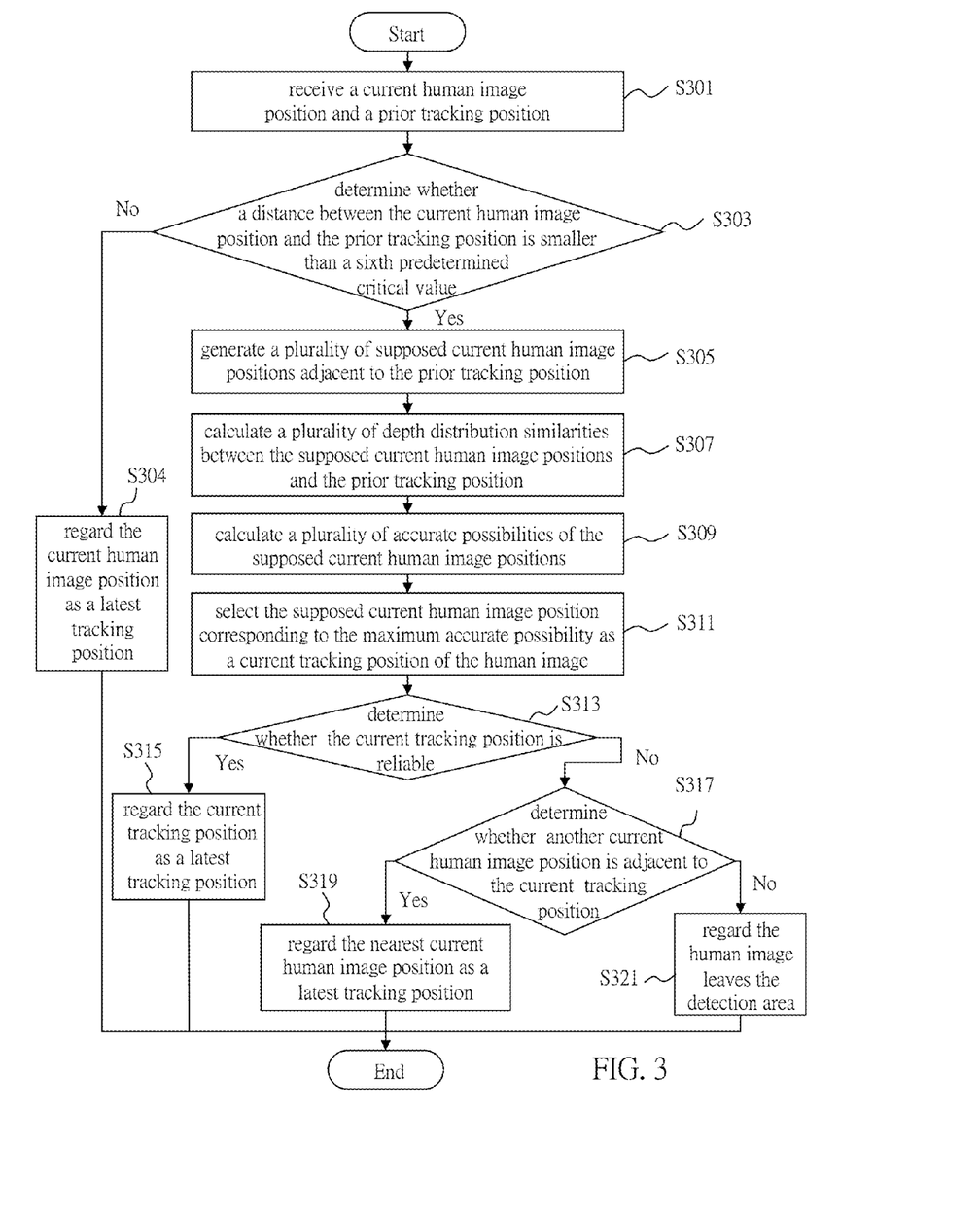
FIG. 3 depicts a human image tracking method, in accordance with an example embodiment of the present disclosure.

FIG. 3 depicts a human image tracking method, in accordance with an example embodiment of the present disclosure. In an embodiment, the human image tracking unit 125 receives a current human image position ($x_i,y_i$) at current time T from the human image detection unit 123 and a prior tracking position ($x_j,y_j$) at the moment T−1 before the current time T as detected by the human image tracking unit 125 and stored in the storage unit 127 (S301). The current human image position ($x_i,y_i$) is not limited to being obtained by the aforementioned human image detection method.

The human image tracking unit 125 determines whether a distance between the current human image position ($x_i,y_i$) at current time T and the prior tracking position ($x_j,y_j$) at the moment T−1 is less than a sixth predetermined critical value (S303). Thus, the human image tracking unit 125 determines whether the prior tracking position ($x_j,y_j$) at the moment T−1 is near the current human image position ($x_i,y_i$). If the distance between the current human image position ($x_i,y_i$) and the prior tracking position ($x_j,y_j$) is less than the sixth predetermined critical value, the human image tracking unit 125 generates a plurality of supposed current human image positions adjacent to the prior tracking position ($x_j,y_j$) (S305). If the distance between the current human image position ($x_i,y_i$) and the prior tracking position ($x_j,y_j$) is greater than the sixth predetermined critical value, the human image tracking unit 125 regards the current human image position ($x_i,y_i$) as the latest tracking position (S304).

After generating the plurality of supposed current human image positions adjacent to the prior tracking position, the human image tracking unit 125 calculates a plurality of depth distribution similarities between the supposed current human image positions and the prior tracking position ($x_j,y_j$) (S307). More specifically, the method of calculating the depth distribution similarities may be a 3D diffusion distance method, which compares a degree of similarity between each supposed current human image position and the prior tracking position $(x_j, y_j)$. For example, the depth distributions of the supposed current human image position and the prior tracking position $(x_j, y_j)$ are presented in two histograms, $h_1(x)$ and $h_2(x)$ respectively. The difference of the two histograms is represented as $d(x) = h_1(x) - h_2(x)$, in which $d(x)$, $h_1(x)$, and $h_2(x)$ have the same bin.

According to a theory of heat diffusion, the temperature field is represented as $T(x,t)$, in which x is a vector, t is time, and heat can diffuse in all directions. Based on a heat diffusion equation, $$\frac{\partial T}{\partial t} = \frac{\partial^2 T}{\partial x^2},$$

the temperature field $T(x,t)$ can be represented as $T(x,t) = T_0(x) * \phi(x,t)$, in which $T_0(x)$ is an initial temperature, and $\phi(x,t)$ is a kernel of Gaussian diffusion, $$\phi(x, t) = \frac{1}{(2\pi)^{1/2} t} \exp\left(-\frac{x^2}{2t^2}\right).$$

Figure 4:
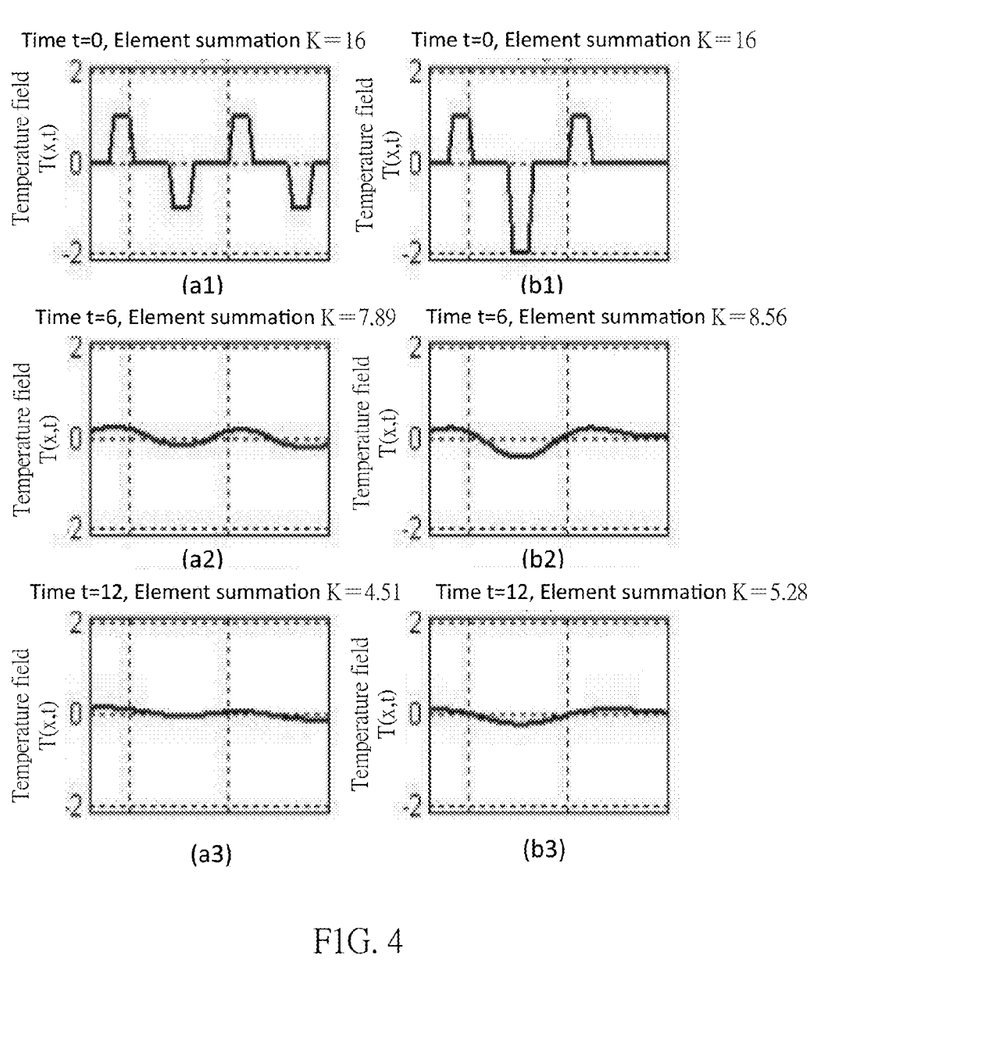

Applying the heat diffusion theory on the histograms $h_1(x)$ and $h_2(x)$ of the depth distributions, the difference $d(x)$ of the two histograms can be represented by temperature field $T(x,t)$, and $d(x) = T_0(x) = T(x,0)$ as shown in FIGS. 4(a1)-4(a3) and 4(b1)-4(b3). With the diffusion over time, the summation of the difference of the two histograms is represented as $$d_d(x) = \sum_t K(|T(x, t)|),$$

in which $K(|T(x,t)|)$ is the summation of all elements of $T(x,t)$, that is $K(|T(x,t)|)$ represents summation of all binary elements of $T(x,t)$ after diffusion time t, in which the summations may be positive or negative.

As shown in FIGS. 4(a1)-4(a3) and 4(b1)-4(b3), curves representing the differences between the histograms $h_1(x)$ and $h_2(x)$ become gradual. The summation of the differences of the two histograms $d_d(x)$, which may be a diffusion distance, can be obtained by adding $K(|T(x,t)|)$ at different times (t=0, t=6, and t=12). In an embodiment, the greater the diffusion distance $d_d(x)$, the smaller the depth distribution similarity.

The human image tracking unit 125 calculates a plurality of accurate possibilities corresponding to the supposed current human image positions according to the depth distribution similarities and the depth image data from the image processing unit 121 (S309). More specifically, the human image tracking unit 125 matches the diffusion distances $d_d(x)$ to the possibilities. The accurate possibilities can be represented as $P(x|z) = e^{\lambda d_d(x)}$ in which $\lambda$ is a user defined value indicating a rate parameter of exponential distribution, and z is the depth image data of the image processing unit 121. Each of the accurate possibilities P presents a similarity possibility of each supposed current position on the diffusion distance histogram and the prior tracking portion under the condition of the depth image data. Accordingly, the accurate possibilities P of the supposed current positions are obtained.

The human image tracking unit 125 selects the supposed current position corresponding to the maximum accurate possibility as a current tracking position of the human image (S311). The human image tracking unit 125 regards the current tracking position as the latest tracking position and stores it in the storage unit 127 for the next prior tracking position at the next time T+1.

In an embodiment, the human image tracking unit 125 further determines whether the current tracking position is reliable (S313). More specifically, the human image tracking unit 125 determines whether the current tracking position is reliable by comparing the maximum accurate possibility of the current tracking position with a seventh predetermined critical value.

If the maximum accurate possibility is greater than the seventh predetermined critical value, the human image tracking unit 125 determines that the current tracking position is reliable and regards it as a latest tracking position (S315). If the maximum accurate possibility is less than the seventh predetermined critical value, the human image tracking unit 125 determines that the current tracking position is unreliable, and further determines whether another current human image position is adjacent to the current tracking position (S317).

If another current human image position is adjacent to the current tracking position, the human image tracking unit 125 regards the nearest current human image position as the latest tracking position (S319). If no other current human image position is adjacent to the current tracking position, the human image tracking unit 125 decides that the human image has left the detection area (S321).

An advantage of the human image detection method and the human image tracking method operated by the human image tracker described herein is improved detection and tracking efficiency for human images. By using the graph-based segment process and supposing the current position, the present method can reduce the detection and tracking time respectively.

Realizations in accordance with the present disclosure have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Field of the Disclosure," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A human image detection method for detecting a human image position in a detection area, comprising:
   receiving by an image processing unit a depth image data from a depth image sensor;
   removing by the image processing unit a background image of the depth image data for obtaining a foreground image;
   receiving the foreground image by a human image detection unit, which performs a graph-based segment process on the foreground image to obtain a plurality of graph blocks;
   determining by the human image detection unit whether a potential human region exists in the graph blocks according to an area size of each graph block; determining by the human image detection unit whether the potential human region is a potential human head region according to a similarity between the potential human region and a hemisphere model if the potential human region exists;
   determining by the human image detection unit whether the potential human head region is a real human head region according to an area size of a surrounding region adjacent to the potential human head region if the potential human region is the potential human head region; and
   determining by the human image detection unit the position of the real human head region as the human image position if the potential human head region is the real human head region.

2. The method according to claim 1, wherein the removing the background image of the depth image data comprises: removing a stationary object in the depth image data.

3. The method according to claim 2, wherein the performing the graph-based segment process on the foreground image comprises: calculating a plurality of depth differences between two adjacent pixels of all pixels of the depth image data; and sorting out pixels having depth differences less than a first predetermined critical value from all pixels and classifying them as belonging to the same graph block.

4. The method according to claim 1, wherein the determining whether a potential human region exists in the graph blocks comprises: calculating the area size of each graph block; and determining whether the area size of each graph block is greater than a second predetermined critical value.

5. The method according to claim 4, wherein if the area size of at least one graph block is greater than the second predetermined critical value, the human image detection unit determines that the potential human region exists in the graph blocks.

6. The method according to claim 4, wherein if none of the area sizes of the graph blocks is greater than the second predetermined critical value, the human image detection unit determines that the potential human region does not exist in the graph blocks, and the image processing unit receives another depth image data from the depth image sensor.

7. The method according to claim 1, wherein the determining whether the potential human region is the potential human head region comprises: calculating a difference between a plurality of three dimensional pixel coordinates of the potential human head region and the hemisphere model, wherein a smaller difference represents a higher similarity, and a greater difference represents a lower similarity; and determining whether the similarity is greater than a third predetermined critical value.

8. The method according to claim 7, wherein if the similarity is greater than the third predetermined critical value, the human image detection unit determines that the potential human region is the potential human head region.

9. The method according to claim 7, wherein if the similarity is less than the third predetermined critical value, the human image detection unit determines that the potential human region is not the potential human head region, and the image processing unit receives another depth image data from the depth image sensor.

10. The method according to claim 1, wherein the determining whether the potential human head region is the real human head region comprises: regarding a central position of the hemisphere model as the position of the potential human head region if the similarity is high; calculating a plurality of depth differences between a depth of the position of the potential human head region and a plurality of depths of pixels in the surrounding region adjacent to the potential human head region; adding sums of the depth differences, in which each depth difference is less than a fourth predetermined critical value; and determining whether the area of the surrounding region adjacent to the potential human head region is greater than a fifth predetermined critical value according to the sums of the depth differences.

11. The method according to claim 10, wherein if the area of the surrounding region adjacent to the potential human head region is greater than the fifth predetermined critical value, the human image detection unit determines that the potential human head region is a reliable real human head region.

12. The method according to claim 10, wherein if the area of the surrounding region adjacent to the potential human head region is less than the fifth predetermined critical value, the human image detection unit determines that the potential human head region is not the real human head region, and the image processing unit receives another depth image data from the depth image sensor.

13. A human image tracking method for tracking a human image in a detection area operated by a human image tracking unit connected to an image processing unit and a human image detection unit, the method comprising:
   receiving a current human image position from the human image detection unit and a prior tracking position detected by the human image tracking unit;
   determining whether a distance between the current human image position and the prior tracking position is less than a first predetermined critical value;
   generating a plurality of supposed current human image positions adjacent to the prior tracking position if the distance is less than the first predetermined critical value;
   calculating a plurality of depth distribution similarities between the supposed current human image positions and the prior tracking position;

calculating a plurality of accurate possibilities of the supposed current human image positions according to the plurality of depth distribution similarities; and selecting the supposed current human image position corresponding to a maximum accurate possibility as a current tracking position of the human image.

14. The method according to claim 13, wherein the human image tracking unit regards the current human image position as a latest tracking position if the distance is greater than the first predetermined critical value.

15. The method according to claim 13, further comprising: the human image tracking unit determining whether the current tracking position is reliable based on a comparison of the maximum accurate possibility and a second predetermined critical value.

16. The method according to claim 15, wherein if the maximum accurate possibility is greater than the second predetermined critical value, the human image tracking unit determines that the current tracking position is reliable and regards the current tracking position as a latest tracking position.

17. The method according to claim 15, wherein if the maximum accurate possibility is less than the second predetermined critical value, the human image tracking unit determines that the current tracking position is unreliable and determines whether another current human image position is adjacent to the current tracking position.

18. The method according to claim 17, wherein if the human image tracking unit determines that another current human image position is adjacent to the current tracking position, the human image tracking unit regards the nearest current human image position as a latest tracking position.

19. The method according to claim 17, wherein if the human image tracking unit determines that no other current human image position is adjacent to the current tracking position, the human image tracking unit decides that the human image has left the detection area.

20. A human image tracking system for detecting and tracking a human image position in a detection area, comprising:
a depth image sensor configured to detect a depth image data in the detection area; and
a human image tracker comprising:
an image processing unit connected to the depth image sensor, configured to receive the depth image data and remove a background image of the depth image data for obtaining a foreground image;
a human image detection unit connected to the image processing unit, configured to receive the foreground image, perform a graph-based segment process on the foreground image to obtain a plurality of graph blocks, determine whether a potential human region exists in the graph blocks according to an area size of each graph block, determine whether the potential human region is a potential human head region according to a similarity between the potential human region and a hemisphere model, determine whether the potential human head region is a real human head region according to an area size of a surrounding region adjacent to the potential human head region, and regard the position of the real human head region as the human image position if the potential human head region is the real human head region; and
a human image tracking unit connected to the human image detection unit, configured to receive a current human image position from the human image detection unit and a prior tracking position detected by the human image tracking unit, generate a plurality of supposed current human image positions adjacent to the prior tracking position according to a distance between the current human image position and the prior tracking position, calculate a plurality of depth distribution similarities between the supposed current human image positions and the prior tracking position, calculate a plurality of accurate possibilities of the supposed current human image positions according to the depth distribution similarities, and select the supposed current human image position corresponding to the maximum accurate possibility as a current tracking position of the human image.

21. The system according to claim 20, wherein the human image detection unit performs the graph-based segment process on the foreground image by calculating a plurality of depth differences between two adjacent pixels of all pixels of the depth image data, and sorting out pixels having depth differences less than a first predetermined critical value from the all pixels and classifying them as belonging to the same graph block.

22. The system according to claim 20, wherein the human image detection unit determines whether the potential human region exists in the graph blocks by calculating the area size of each graph block and determining whether the area size of each graph block is greater than a second predetermined critical value.

23. The system according to claim 20, wherein the human image detection unit determines whether the potential human region is the potential human by calculating a difference between a plurality of three dimensional pixel coordinates of the potential human head region and the hemisphere model, wherein a smaller difference represents a higher similarity, and a greater difference represents a lower similarity, and determining whether the similarity is greater than a third predetermined critical value.

24. The system according to claim 20, wherein the human image detection unit determines whether the potential human head region is the real human head region by regarding a central position of the hemisphere model as the position of the potential human head region if the similarity is high, calculating a plurality of depth differences between the depth of the position of the potential human head region and a plurality of depths of pixels the surrounding region adjacent to the potential human head region, adding the sums of the depth differences, in which each depth difference is less than a fourth predetermined critical value, and determining whether the area of the surrounding region adjacent to the potential human head region is greater than a fifth predetermined critical value according to the sums of the depth differences.

25. The system according to claim 20, therein the human image tracking unit determines whether the current tracking position is reliable based on a comparison between a maximum accurate possibility and a seventh predetermined critical value.

* * * * *